US009970236B2

(12) United States Patent
Nanayakkara et al.

(10) Patent No.: US 9,970,236 B2
(45) Date of Patent: May 15, 2018

(54) MITIGATING STICK-SLIP EFFECTS IN ROTARY STEERABLE TOOLS

(71) Applicant: Halliburton Energy Services, Inc., Houston, TX (US)

(72) Inventors: Ravi P. Nanayakkara, Kingwood, TX (US); Neelesh Deolalikar, Houston, TX (US); Daniel Martin Winslow, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 294 days.

(21) Appl. No.: 14/889,908

(22) PCT Filed: Dec. 29, 2014

(86) PCT No.: PCT/US2014/072572
§ 371 (c)(1),
(2) Date: Nov. 9, 2015

(87) PCT Pub. No.: WO2016/108824
PCT Pub. Date: Jul. 7, 2016

(65) Prior Publication Data
US 2016/0356089 A1 Dec. 8, 2016

(51) Int. Cl.
*E21B 7/06* (2006.01)
*E21B 4/02* (2006.01)
(Continued)

(52) U.S. Cl.
CPC ............ *E21B 7/062* (2013.01); *E21B 4/006* (2013.01); *E21B 4/02* (2013.01); *E21B 4/04* (2013.01);
(Continued)

(58) Field of Classification Search
USPC .......................................... 475/331, 346, 347
See application file for complete search history.

(56) References Cited

U.S. PATENT DOCUMENTS 5,265,682 A * 11/1993 Russell .................... E21B 4/02
175/45
6,837,315 B2 * 1/2005 Pisoni .................... E21B 7/067
175/269
(Continued)

FOREIGN PATENT DOCUMENTS

| WO | 2010024731 A1 | 3/2010 |
| WO | 2013158096 A1 | 10/2013 |
| WO | 2014098900 A1 | 6/2014 |

OTHER PUBLICATIONS

International Search Report and Written Opinion for PCT/US2014/072572 dated Sep. 18, 2015.

*Primary Examiner* — Kyle Armstrong
(74) *Attorney, Agent, or Firm* — McDermott Will & Emery LLP

(57) ABSTRACT

Steering assemblies including a housing having an actuator positioned therein and operable to rotate a drive shaft. A planetary gearbox is positioned in the housing and includes a ring gear operatively coupled to the housing, a sun gear coupled to the drive shaft, and a planet carrier. A mechanical coupling operatively couples the ring gear to the housing such that rotation of the housing rotates the ring gear. The mechanical coupling is selected based on an ability of one or more mechanical parameters of the mechanical coupling to mitigate the stick-slip disturbance transmitted between the housing and the ring gear. An offset mandrel coupled to one of the sun gear and the planet carrier such that rotation of the one of the sun gear and the planet carrier causes the offset mandrel to correspondingly rotate, wherein the offset mandrel is independently rotatable with respect to the housing.

21 Claims, 5 Drawing Sheets

(51) Int. Cl.
*E21B 4/04* (2006.01)
*E21B 44/00* (2006.01)
*E21B 47/024* (2006.01)
*E21B 4/00* (2006.01)
*F16H 1/28* (2006.01)
*F16H 57/08* (2006.01)

(52) U.S. Cl.
CPC ............ *E21B 7/067* (2013.01); *E21B 44/005* (2013.01); *E21B 47/024* (2013.01); *F16H 1/28* (2013.01); *F16H 57/08* (2013.01)

(56) References Cited

U.S. PATENT DOCUMENTS

| | | |
|---|---|---|
| 7,779,933 B2 | 8/2010 | Sihler et al. |
| 2012/0241170 A1 | 9/2012 | Hales et al. |
| 2013/0292180 A1 | 11/2013 | Kolle |
| 2014/0102802 A1 | 4/2014 | Kolle |

* cited by examiner

US 9,970,236 B2

MITIGATING STICK-SLIP EFFECTS IN ROTARY STEERABLE TOOLS

This application is a National Stage entry of and claims priority to International Application No. PCT/US2014/072572, filed on Dec. 29, 2014.

BACKGROUND

As hydrocarbon reservoirs become more difficult to reach, wellbore drilling operations become more complex both vertically and horizontally, and the need to precisely locate a drilling assembly within desired subterranean formations increases. This requires accurately steering the drilling assembly either to avoid particular formations or to intersect formations of interest. Steering the drilling assembly includes changing the tool face direction of a drill bit coupled to the end of the drilling assembly.

Rotary steerable tools are commonly used in directional drilling operations and can include an offset mandrel or other assembly that may be coupled to a rotating housing. It may be desirable to control the rotation of the offset mandrel independently from the rotation of the housing and otherwise maintain the offset mandrel in a geostationary position with respect to the formations being penetrated by the drill bit. In some rotary steerable systems, the drill bit may be operatively coupled to the offset mandrel via a bit shaft. It may be desirable to control the rotation of the offset mandrel and, therefore, the orientation of the bit shaft and drill bit, independently of the rotation of the drill string and the drill bit. Responsive control of the rotation of the offset mandrel may reduce overall rig time by ensuring that the wellbore is drilled according to a desired well plan.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure is generally related to well drilling operations and, more particularly, to reducing the effects of stick-slip experienced by fully rotating rotary steerable tools.

The embodiments described herein provide a steering assembly that reduces the adverse effects of stick-slip disturbances induced during drilling operations. Stick-slip is generally a drill string phenomenon that occurs when the required drilling torque causes a buildup of torsional energy in the drill string. The torsional energy overcomes the resistance, which results in a rapid release of energy in the form of drill string acceleration. This phenomenon can become periodic and thus result in sustained adverse drilling conditions. The present disclosure provides a mechanical coupling that may be included in the steering assembly to help mitigate adverse effects of stick-slip disturbance, and thereby improve sensor and drilling performance in directional drilling applications.

The exemplary steering assemblies described herein include a housing having a turbine positioned therein and operable to rotate a drive shaft. A planetary gearbox is positioned in the housing and includes a ring gear operatively coupled to the housing, a sun gear coupled to the drive shaft, and a planet carrier. A mechanical coupling operatively couples the ring gear to the housing such that rotation of the housing rotates the ring gear. The mechanical coupling may be selected based on an ability of one or more mechanical parameters of the mechanical coupling to mitigate the stick-slip disturbance transmitted between the housing and the ring gear. By reducing the stick-slip disturbance transmitted between the housing and the ring gear, directional drilling may be improved by enhancing tool face control provided by a control system. Moreover, the power used by the control system to mitigate the stick-slip disturbance may be reduced for a given amplitude and/or frequency of stick-slip, thereby enabling the use of a smaller power generator.

Figure 1:
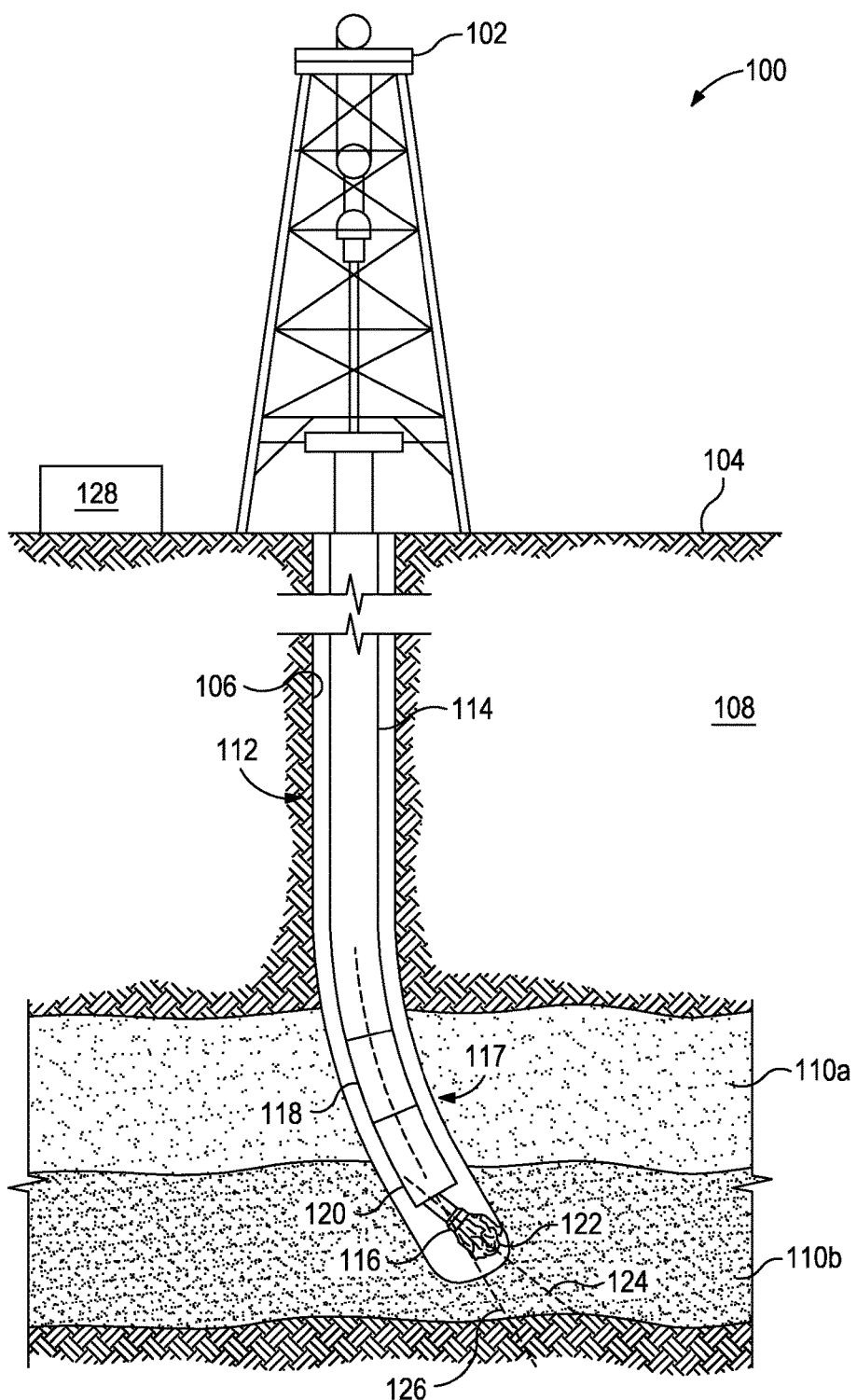
FIG. 1 is a schematic diagram of an exemplary drilling system that may employ one or more principles of the present disclosure.

FIG. 1 is a schematic diagram of an exemplary drilling system 100 that may employ the principles of the present disclosure, according to one or more embodiments. As illustrated, the drilling system 100 may include a rig 102 mounted at a surface location 104 and positioned above a borehole 106 extending into the Earth 108, including subterranean formations 110a and 110b. A drilling assembly 112 may be extended into the borehole 106 from the rig 102. The drilling assembly 112 may include a drill string 114, which may include a plurality of threadably connected tubular segments, and a drill bit 116 may be coupled to the end of the drill string 114. A bottom hole assembly (BHA) 117 may be arranged in the drill string 114 and may include, for example, a measurement-while-drilling (MWD) apparatus 118 and a steering assembly 120.

The steering assembly 120 may be configured to control the direction in which the borehole 106 is being drilled. As will be appreciated, the borehole 106 will generally be drilled in a direction perpendicular to the tool face 122 direction of the drill bit 116, which corresponds to a longitudinal axis 124 of the drill bit 116. Accordingly, controlling the direction of the borehole 106 may include controlling the angle between the longitudinal axis 124 of the drill bit 116 and a longitudinal axis 126 of the steering assembly 120, and thereby controlling the angular orientation of the drill bit 116 relative to the subterranean formations 110a,b being drilled.

As described in more detail below, the steering assembly 120 may include an offset mandrel (not shown) that causes the longitudinal axis 124 of the drill bit 116 to deviate from the longitudinal axis 126 of the steering assembly 120. The offset mandrel may be counter-rotated relative to the rotation of the drill string 114 to maintain an angular orientation of the drill bit 116 relative to the subterranean formations 110a,b being drilled. The steering assembly 120 may receive control signals from a control unit 128 located on the surface 104. Although the control unit 128 is shown in FIG. 1 as being located on the surface 104, the control unit 128 may alternatively be located downhole (e.g., in the BHA 117) or at a remote location, without departing from the scope of the disclosure. The control unit 128 may include an information handling system and computer-readable media, and it may be configured to communicate with the steering assembly 120 via a telemetry system.

In certain embodiments, as will be described below, the control unit 128 may transmit control signals to the steering assembly 120 to alter the longitudinal axis 124 of the drill bit 116 as well as to control counter-rotation of the offset mandrel to maintain the angular orientation of the drill bit 116 relative to the subterranean formation 110a,b being drilled. As used herein, maintaining the angular orientation of the drill bit 116 relative to the subterranean formation 110a,b may be referred to herein as maintaining the drill bit 116 in a "geostationary" position. In certain embodiments, an information handling system and computer-readable media may be included in and otherwise associated with the steering assembly 120 to perform some or all of the control functions. Moreover, other components of the BHA 117, including the MWD apparatus 118, may communicate with and receive instructions from the control unit 128.

In exemplary operation, the drill string 114 may be rotated to drill the borehole 106. Rotating the drill string 114 may cause the BHA 117 and the drill bit 116 to rotate in the same direction and at generally the same speed. The rotation may cause the steering assembly 120 to rotate about the longitudinal axis 126, and the drill bit 116 to rotate about both longitudinal axes 124, 126. Rotating the drill bit 116 about its longitudinal axis 124 causes the drill bit 116 to cut into the subterranean formations 110a,b. However, rotating the drill bit 116 about the longitudinal axis 126 of the steering assembly 120 may be undesired in certain instances as this may change the angular orientation of the drill bit 116 relative to the subterranean formations 110a,b being drilled. For example, when the longitudinal axis 124 of the drill bit 116 is offset from the longitudinal axis 126 of the steering assembly 120, as shown in FIG. 1, the drill bit 116 may rotate about the longitudinal axis 126 of the steering assembly 120, and thereby prevent the drilling assembly 100 from drilling at a particular angle and direction, and may result in a larger borehole being created.

Figure 2A:
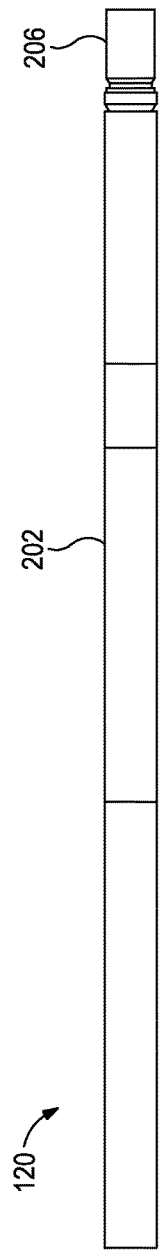
FIGS. 2A-2C are schematic diagrams of the steering assembly of FIG. 1.
Figure 2B:
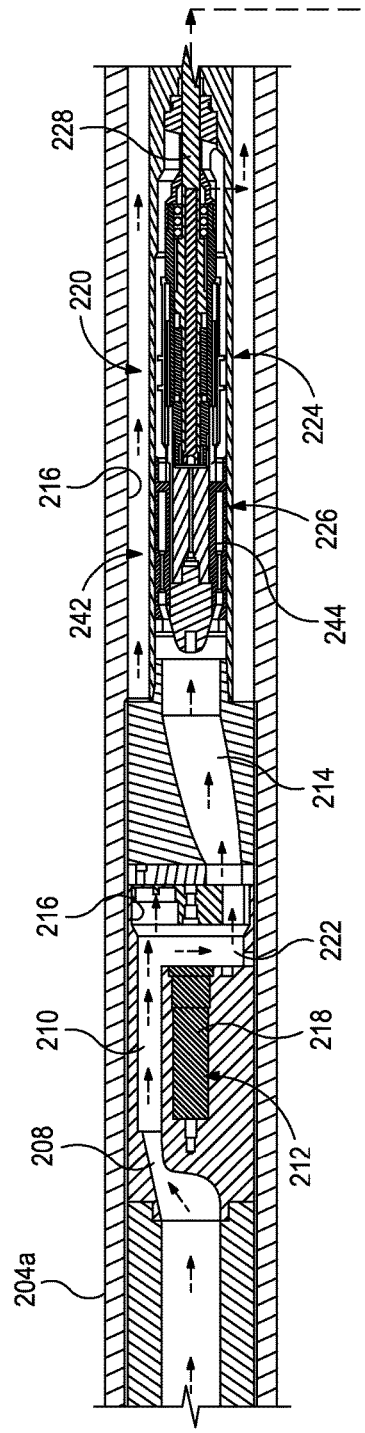
Figure 2C:
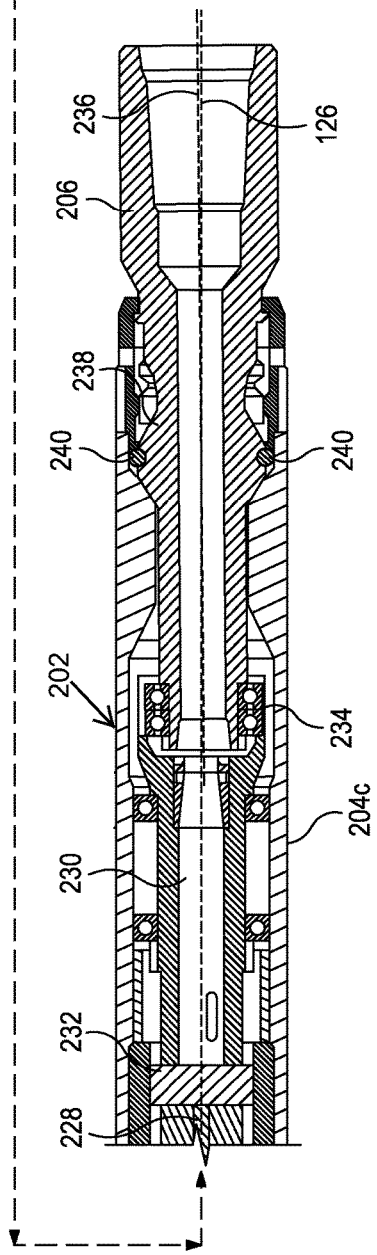

Referring now to FIGS. 2A-2C, with continued reference to FIG. 1, illustrated are schematic diagrams of the steering assembly 120, according to one or more embodiments. More particularly, FIG. 2A is a plan view of the steering assembly 120, FIG. 2B is a cross-sectional side view of a first portion of the steering assembly 120, and FIG. 2C is a cross-sectional side view of a second portion of the steering assembly 120. The steering assembly 120 may include a housing 202 that may be operatively coupled to the drill string 114 (FIG. 1). In some embodiments, the housing 202 may be directly coupled to the drill string 114. In other embodiments, however, the housing 202 may be indirectly coupled to the drill string 114, such as through the MWD apparatus 118 (FIG. 1), but nonetheless operatively coupled to the drill string 114 such that rotation of the drill string 114 correspondingly rotates the housing 202.

In some embodiments, the housing 202 may encompass a monolithic and otherwise unitary structure. In other embodiments, however, the housing 202 may include multiple sections, shown as a first section 204a, a second section 204b, and a third section 204c. Each section 204a-c may correspond to a separate tool portion of the steering assembly 120. For example, the first section 204a may house control mechanisms for the steering assembly 120, and may communicate with the control unit 128 (FIG. 1) and/or receive control signals from the surface 104 (FIG. 1). In certain embodiments, the control mechanisms may include an information handling system and computer-readable media and may receive measurements from various sensors arranged within the steering assembly 120. Sensors that may be included in the sensor assembly 120 include, but are not limited to, a position or gravity sensor to measure tool face 122 (FIG. 1) direction, velocity sensors, and vibration sensors. The data obtained from these sensors may be fed into a closed-loop feedback system that helps accurately direct the drill bit 116 (FIG. 1) during drilling, as described more below. The second section 204b may include drive elements, including a variable flow pathway and a flow-controlled drive mechanism. The third section 204c may include steering elements that control the drilling angle and axial orientation of the drill bit 116 as coupled to a bit shaft 206 of the steering assembly 120.

A drilling fluid or "mud" may be pumped into the drill string 114 (FIG. 1) and subsequently through the steering assembly 120 during drilling operations. The drilling fluid may flow through one or more ports 208 and into an annulus 210 defined within the first section 204a. Once in the annulus 210, the drilling fluid may flow around a flow control module 212 and subsequently flow into an inner annulus 214 or be diverted into a bypass annulus 216. The flow control module 212 may include a flow control valve 218 that controls the amount of drilling fluid that enters the inner annulus 214 to drive a fluid-controlled drive mechanism 220. More particularly, the fluid pathway extending between the port 208 and the inner annulus 214 may include a variable flow fluid pathway 222, and the flow control valve 218 may be configured to meter the amount of fluid passing through the variable flow fluid pathway 222. The flow control valve 218 may be any type of flow restricting valve or device including, but not limited to, a shear valve, a poppet valve, a ball valve, a globe valve, or any other type of mechanical means that may control the flow of drilling fluid. As will be appreciated, however, other variable flow fluid pathways 222 are also possible, using a variety of valve configurations that meter the flow of drilling fluid.

The fluid-controlled drive mechanism 220 may be in fluid communication with the variable flow fluid pathway 222 via the inner annulus 214. In the embodiment shown, the fluid-controlled drive mechanism 220 comprises a turbine, but other fluid-controlled drive mechanisms may be used, such as a mud motor. Moreover, the fluid-controlled drive mechanism 220 may be replaced with any type of actuator capable of rotating a drive shaft. Accordingly, the fluid-controlled drive mechanism 220 may alternatively comprise an actuator, such as an electric motor, a mud motor, etc. For purposes of describing the steering assembly 120, however, the fluid-controlled drive mechanism 220 will be referred to herein as "the turbine 220," but such nomenclature should not be considered limiting to the present disclosure. The turbine 220 may include a plurality of rotors 224 and a plurality of stators 226 that cooperatively operate to generate rotational movement in response to fluid flow within the inner annulus 214.

The turbine 220 (or any other type of actuator) may generate rotation at a drive shaft 228, which may be operatively coupled to an offset mandrel 230 via a planetary gearbox 232 positioned within the housing 202. As will be described in more detail below, the planetary gearbox 232 may be operatively coupled to the housing 202 such that rotation of the housing 202 correspondingly rotates a portion of the planetary gearbox 232. In operation, the planetary gearbox 232 may allow the drive shaft 228 to impart rotation from the turbine 220 to the offset mandrel 230, such that the offset mandrel 230 may be rotated independently from the housing 202. The offset mandrel 230 may be coupled to the planetary gearbox 232 at one end and may include or otherwise provide an eccentric receptacle 234 at its opposing end. The upper end of the bit shaft 206 may be received into the eccentric receptacle 234, which may be used to alter or maintain a longitudinal axis 236 of the bit shaft 206 and the drill bit 116 (FIG. 1) coupled thereto the bit shaft 206. The longitudinal axis 236 of the bit shaft 206 may be the same as the longitudinal axis 124 (FIG. 1) of the drill bit 116 and, therefore, the eccentric receptacle 234 may be used to alter or maintain the longitudinal axis 124 of the drill bit 116 during operation.

The bit shaft 206 may be pivotally coupled to the housing 202 at a pivot point 238. A series of ball bearings 240 may allow the bit shaft 206 to pivot with respect to the housing 202. As will be appreciated, this coupling may comprise any mechanical coupling such that the upper and lower portions of the coupling are torsionally locked with respect to each other but free to bend within constraints provided by the offset mandrel 230. As the bit shaft 206 pivots about the pivot point 238, the longitudinal axis 236 of the bit shaft 206 is altered, which may offset the longitudinal axis 236 of the bit shaft 206 relative to the longitudinal axis 126 of the steering assembly 120. In addition to allowing the bit shaft 206 to pivot relative to the housing 202, the pivot point 238 may also be used to impart torque from the housing 202 to the bit shaft 206. The torque received from the housing 202 may be transmitted to the drill bit 116 (FIG. 1) as coupled to the end of the bit shaft 206 and, therefore, the longitudinal axis 236 of the bit shaft 206 may correspond to a drilling angle of the steering assembly 120.

In exemplary operation of the steering assembly 120, the drill string 114 (FIG. 1) may be rotated and thereby cause the housing 202 to rotate about the longitudinal axis 126 of the steering assembly. Rotation of the housing 202 may cause the bit shaft 206 to rotate as torque is transferred to the bit shaft 206 at the pivot point 238. The torque may cause the bit shaft 206 to rotate about its longitudinal axis 236 as well as the longitudinal axis 126 of the steering assembly 120. When the longitudinal axis 236 of the bit shaft 206 is offset relative to the longitudinal axis 126 of the steering assembly 120, this may cause the end of the bit shaft 206 to rotate with respect to the longitudinal axis 126 of the steering assembly, and thereby changing the angular direction of the bit shaft 206 and associated drill bit 116 (FIG. 1) with respect to the surrounding formations 110a,b (FIG. 1).

In certain embodiments, it may be desirable to control the speed of the turbine 220 due to a change in input or a change in target output. For example, the fluid flow coming through the port 208 may be fluctuating, and it may be desirable to keep the speed of the turbine 220 constant. Alternatively, it may be desirable to increase the speed of the turbine 220 by allowing more fluid to enter through the port 208. In such embodiments, the flow control valve 218 may be actuated to control the amount/flow of drilling fluid that enters the inner annulus 214 to drive the turbine 220. According to aspects of the present disclosure, the rotational speed of the turbine 220 may be controlled by the mass flow rate of drilling fluid that flows into the inner annulus 214. Consequently, the flow control valve 218 may be used to control the rotational speed of the turbine 220 by varying the mass flow rate of the drilling fluid that flows into the inner annulus 214. The flow control valve 218 may include control circuitry connected to a motor that operates to open and close the flow control valve 218. The control circuitry may be located downhole, such as proximate to the flow control valve 218, or may alternatively be located at the surface 104 (FIG. 1), such as forming part of the control unit 128 (FIG. 1).

In some embodiments, a generator 242 may be included in the steering assembly 120 and coupled to the turbine 220 to generate electrical power that may be used by the components of the steering assembly 120. In certain situations, the generator 242 may be producing changing electrical loads and/or the fluid in the inner annulus 214 may be traveling at a variable rate. When higher electrical loads are present on the generator 242, the speed of the turbine 220 may slow down. Further, if the speed of the generator 242 drops too low, it may not produce the required voltage since the voltage output of the generator 242 is proportional to the speed of the generator 242. In at least one embodiment, the generator 242 may be arranged at or near the stator 226 of the turbine 220, which may be magnetically coupled to a shaft that carries the rotors 224 via one or more electromagnets 244. As the turbine 220 rotates, so does the shaft that carries the rotors 224, which may cause the electromagnet(s) 244 to rotate around the stators 226. This may generate an electrical current within the generator 242, which may be used to power a variety of control mechanisms and sensors located within the steering assembly 120, including control mechanisms within the first section 204a.

Figure 3:
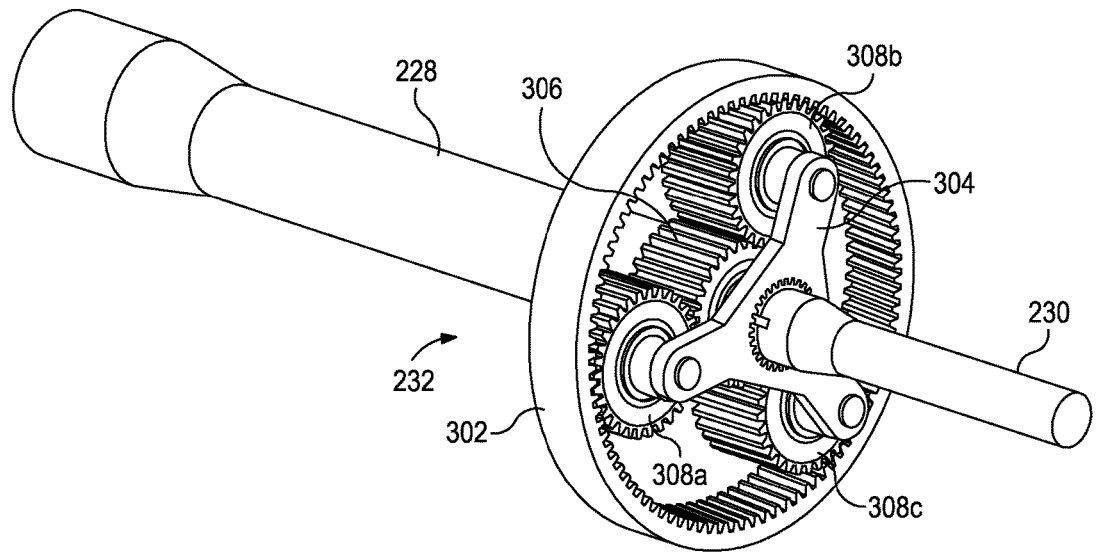
FIG. 3 is an isometric view of the planetary gearbox of FIG. 2C.

Referring now to FIG. 3, with continued reference to FIGS. 2A-2C, illustrated is an isometric view of the planetary gearbox 232, according to one or more embodiments. The planetary gearbox 232 may be generally characterized as a speed/position control mechanism, according to aspects of the present disclosure. As illustrated, the planetary gearbox 232 may include a ring gear 302, a planet carrier 304, and a sun gear 306. The planet carrier 304 is depicted as including three planet gears, shown as a first planet gear 308a, as second planet gear 308b, and a third planet gear 308c. In other embodiments, however, more or less than three planet gears 308a-c may be used, without departing from the scope of the disclosure.

As discussed above, the planetary gearbox 232 may be positioned within the steering assembly 120 (FIGS. 2A-2C) and operatively coupled to the inner walls of the housing 202 such that rotation of the housing 202 may induce a similar rotation on the ring gear 302. The sun gear 306 may be coupled to or otherwise form part of the drive shaft 228 of the turbine 220 (FIG. 2B) such that rotation of the drive shaft 228 (as powered by the turbine 220) may correspondingly rotate the sun gear 306 in the same direction. The offset mandrel 230 may be coupled to the planet carrier 304 such that rotation of the planet carrier 304 around the sun gear 306 may cause the offset mandrel 230 to correspondingly rotate. Rotation of the offset mandrel 230 may be controlled by the rotational speed of the planet carrier 304, which, in turn, may be determined by the relative rotational speeds of the sun gear 306 and the ring gear 302.

For example, if the ring gear 302 is rotating clockwise at a higher rate of rotational speed relative to the counter-clockwise rotation of the sun gear 306, the planet carrier 304 will rotate in a clockwise direction around the sun gear 306, which may cause the offset mandrel 230 to rotate in a clockwise direction. As the sun gear 306 increases in counter-clockwise rotational speed relative to the rotational speed of the ring gear 302, such as in the event of a decrease in rotational speed of the housing 202 (FIG. 2) coupled to ring gear 302, or as a result of an increase in rotational speed of the sun gear 306 driven by the turbine 220, the rotational speed of the planet carrier 304 around the sun gear 306 will slow until, at a certain rotational speed of the sun gear 306, the planet carrier 304 is stationary (although the individual planet gears 308a-c may continue rotating). At this point, the offset mandrel 230 may also remain rotationally stationary. If the sun gear 306 further increases in rotational speed, the planet carrier 304 may begin to rotate in a counter-clockwise direction, thereby causing the offset mandrel 230 to also rotate in a counter-clockwise direction.

As described in more detail below, a closed-loop control mechanism or program may use, but is not limited to, a PID-type (proportional, integral, derivative) control that reads input sensor values from the offset mandrel 230 and outputs control signals to the turbine 220. An error value may be calculated based on the difference between the rotational speed and position of the offset mandrel 230, as measured by one or more sensors, compared to a target rotational speed. If, for example, the offset mandrel 230 is measured to be rotating faster than desired in a clockwise direction (or not fast enough in a counter-clockwise direction), such as when the ring gear 302 increases its clockwise rotational speed, an output signal may be transmitted to increase the speed of the turbine 220 so as to increase the rotational speed of the sun gear 306 in the counter-clockwise direction. Similarly, if the offset mandrel 230 is measured to be rotating slower than desired in a clockwise direction (or not fast enough in a counter-clockwise direction), such as when the ring gear 302 decreases its clockwise rotational speed, an output signal may be transmitted to reduce the speed of turbine 220 so as to decrease the rotational seed of the sun gear 306 in the counter-clockwise direction.

Accordingly, despite changes in rotational speeds of the ring gear 302 (as operatively coupled to the housing 202 of FIG. 2), the rotational speed of the offset mandrel 230 may be independently controlled by varying the rotational speed of the turbine 220. As a result, the turbine 220 may help maintain the offset mandrel 230 in a stationary, non-rotating position or orientation. Further, if a certain orientation is desired, the turbine 220 may first be operated to allow rotation until the offset mandrel 230 is aligned to the desired orientation, and then operated to maintain that desired orientation.

Referring again to FIGS. 2A and 2B, with continued reference to FIG. 3, cooperative operation of the turbine 220 and the planetary gearbox 232 to control the angular orientation of the bit shaft 206 and, therefore, the drill bit 116 (FIG. 1) as coupled to the bit shaft 206, is now described. The ring gear 302 of the planetary gearbox 232 may be operatively coupled to the housing 202 such that rotation of the housing 202 may correspondingly induce rotation of the ring gear 302. The drive shaft 228 of the turbine 220 may be coupled to the sun gear 306, and rotation of the sun gear 306 may be increased or decreased by controlling the flow control valve 218 to regulate the flow of drilling fluid through the turbine 220 and thereby increase or decrease the rotational velocity (RPM) of the drive shaft 228. The offset mandrel 230 may be coupled to the planet carrier 304 such that the position and rotation of the planet carrier 304 may control the angular orientation and rotational speed of the offset mandrel 230 and, therefore, the bit shaft 206. Through operation of the planetary gearbox 232, the rotation of the planet carrier 304 may be determined and otherwise dictated by the relative rotational speeds of the ring gear 302 and the sun gear 306.

During drilling, the drill string 114 (FIG. 1) may be rotated in a first direction at a first speed, causing the housing 202 and the ring gear 302 of the planetary gearbox 232 to rotate in the first direction at the first speed. To control the angular orientation of the bit shaft 206 with respect to the surrounding formation 110a,b (FIG. 1), the flow control valve 218 may be operated to allow a flow of drilling fluid through the turbine 220 such that the drive shaft 228 is rotated in a second direction. The rotation of the drive shaft 228 may cause the sun gear 306 of planetary gearbox 232 to rotate opposite the first direction at a second speed dependent on the amount of fluid flow allowed by the flow control valve 218 through the turbine 220. Within the planetary gearbox 232, the relative difference between the first speed of the ring gear 302 and the second speed of the sun gear 306 determines the rotation of the planet carrier 304 and thus the rotation of the offset mandrel 230. If the rotation of the sun gear 306 offsets the rotation of the ring gear 302, the planet carrier 304 (and thus the eccentric receptacle 234 of the offset mandrel 230) may remain geostationary with respect to the surrounding formation, and thereby maintain the angular orientation of the bit shaft 206 relative to the formation while still allowing the bit shaft 206 to rotate about its longitudinal axis 236. The angular orientation of the bit shaft 206 may be altered relative to the surrounding formation 110a,b by operating the flow control valve 218 to increase or decrease the rotation speed of the turbine 220.

In certain embodiments, the offset mandrel 230, the bit shaft 206, or the drill bit 116 (FIG. 1) coupled to the bit shaft 206 may include or may be proximate to sensors (not shown), such as RPM sensors, positional sensors, accelerometers, magnetometers, or other sensors known to those of skill in the art. The various sensors may be configured to continuously monitor the speed, position, orientation, or other physical characteristics of the offset mandrel 230 and the bit shaft 206 or the drill bit 116. The desired rotational speed, position, magnetic alignment, or other desired setpoints for the drilling operation may be continuously compared with the values measured by the sensors. The sensors may be coupled to electronics (not shown) located either downhole, at the surface 104 (FIG. 1), or at a remote location. The electronics associated with the sensors may issue error signals, which may be processed to relate the measured value to a change in the position of the flow control valve 218 in order to achieve the desired setpoint. Based on the error signal, the flow control valve 218 may then change position, thus altering the flow of the fluid passing through the turbine 220, and thereby resulting in a change in the speed of the turbine 220 and, via the planetary gearbox 232, a change in the rotational speed of the offset mandrel 230. This process may repeat until the desired setpoint has been achieved (or until the system is within an allowable error band).

Figure 4:
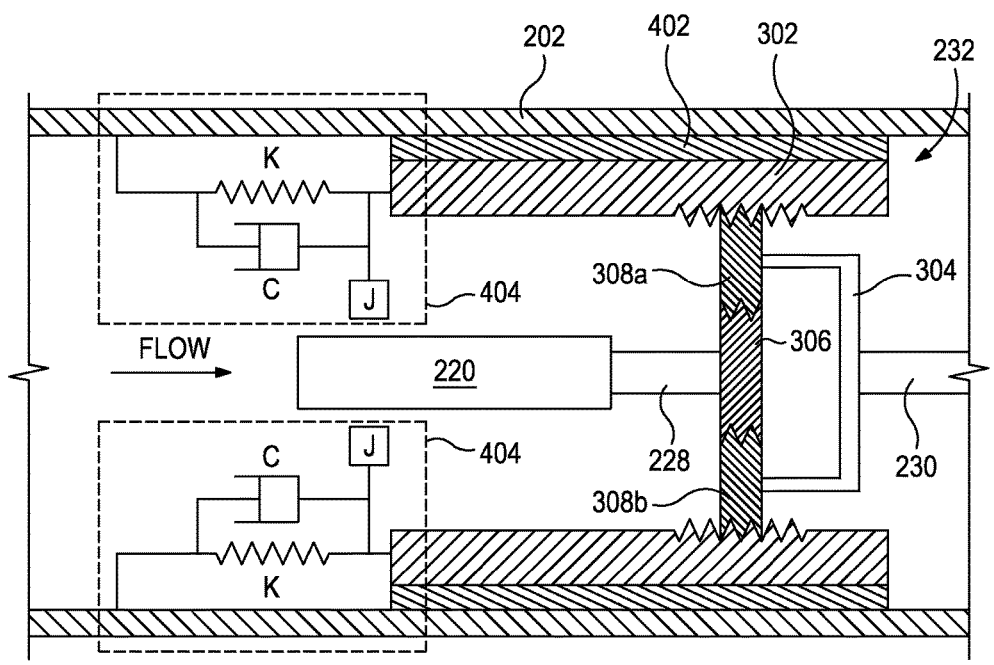
FIG. 4 is an exploded, cross-sectional diagram of the planetary gearbox of FIG. 2C and the turbine of FIG. 2B.

Referring now to FIG. 4, with continued reference to FIG. 3, illustrated is an exploded, cross-sectional diagram of the planetary gearbox 232 as operatively coupled to the turbine 220 and the housing 202, according to one or more embodiments. As illustrated, the drive shaft 228 of the turbine 220 extends toward the planetary gearbox 232 and is coupled to the sun gear 306 such that rotation of the drive shaft 228 (as powered by fluid flow through the turbine 220) correspondingly rotates the sun gear 306 in the same direction. Two planet gears, shown as first and second planet gears 308a,b, are depicted as being carried by the planet carrier 304 and rotatable with respect to the ring gear 302. The offset mandrel 230 may be coupled to the planet carrier 304 such that rotation of the planet carrier 304 around the sun gear 306 causes the offset mandrel 230 to correspondingly rotate.

The planetary gearbox 232 may be operatively coupled to the housing 202 such that rotation of the housing 202 (via rotation of the drill string 114 of FIG. 1) correspondingly rotates the ring gear 302. In some embodiments, the ring gear 302 may be directly coupled to the housing 202. In other embodiments, however, a gearbox shroud or carrier 402 may interpose the housing 202 and the ring gear 302 and may otherwise be coupled to the housing 202 to operatively couple the ring gear 302 to the housing 202. In either case, a direct or indirect coupling of the ring gear 302 to the housing 202 will result in the ring gear 302 rotating in response to rotation of the housing 202.

As illustrated, the planetary gearbox 232 may be operatively coupled to the housing 202 via a mechanical coupling 404 represented graphically by one or more mechanical parameters. The mechanical coupling 404 may encompass and otherwise comprise any coupling design, device, mechanism, system, or assembly capable of mechanically coupling the planetary gearbox 232 to the housing 202, either directly through the ring gear 302 or via the gearbox carrier 402. Suitable mechanical couplings 404 include, but are not limited to, a threaded coupling, a magnetic coupling, a welded coupling, a brazed coupling, a mechanically fastened coupling (i.e., using mechanical fasteners, such as screws, bolts, pins, snap rings, etc.), an adhesive coupling, bellows, a spider coupling, and any combination thereof.

In coupling the planetary gearbox 232 to the housing 202, the mechanical coupling 404 may exhibit various mechanical parameters. As illustrated, the mechanical parameters that characterize the mechanical coupling 404 include, but are not limited to, torsional spring constant (k), damping coefficient (c), and inertia (3). Depending on the value of each mechanical parameter, the mechanical coupling 404 may provide either a more rigid or a more flexible coupling engagement between the planetary gearbox 232 and the housing 202.

According to the present disclosure, the mechanical coupling 404 may be selected based on its known mechanical parameters and otherwise the mechanical parameters of the mechanical coupling 404 may be optimized for downhole operation. This may prove advantageous when the drill string 114 (FIG. 1) undergoes stick-slip, for example, since the operative coupling of the ring gear 302 to the housing 202 results in any variation of the RPM of the housing 202 to be directly transferred to the ring gear 302, and thereby directly affect the control of the offset mandrel 230. More particularly, when the drill string 114 undergoes stick-slip, the oscillating velocity (RPM) of the drill string 114 may be transmitted to the ring gear 302 via the mechanical coupling 404 with the housing 202. Such oscillating velocity, referred to herein as "stick-slip disturbance," may be transmitted to the offset mandrel 230, and thereby require the control system to rapidly mitigate the stick-slip disturbance in an attempt to maintain the offset mandrel 230 geostationary. If the stick-slip disturbance oscillates at a high enough frequency, however, operation of the turbine 220 and the flow control valve 218, as described above, may not be sufficient to overcome the adverse effects, and operation of the planetary gearbox 232 in offsetting the rotation of the ring gear 302 may then be frustrated. More specifically, controlling the tool face 122 (FIG. 1) under high frequency stick-slip (within the bandwidth of the system) may require high power and even then may be unstable due to inadequate controller performance.

Figure 5:
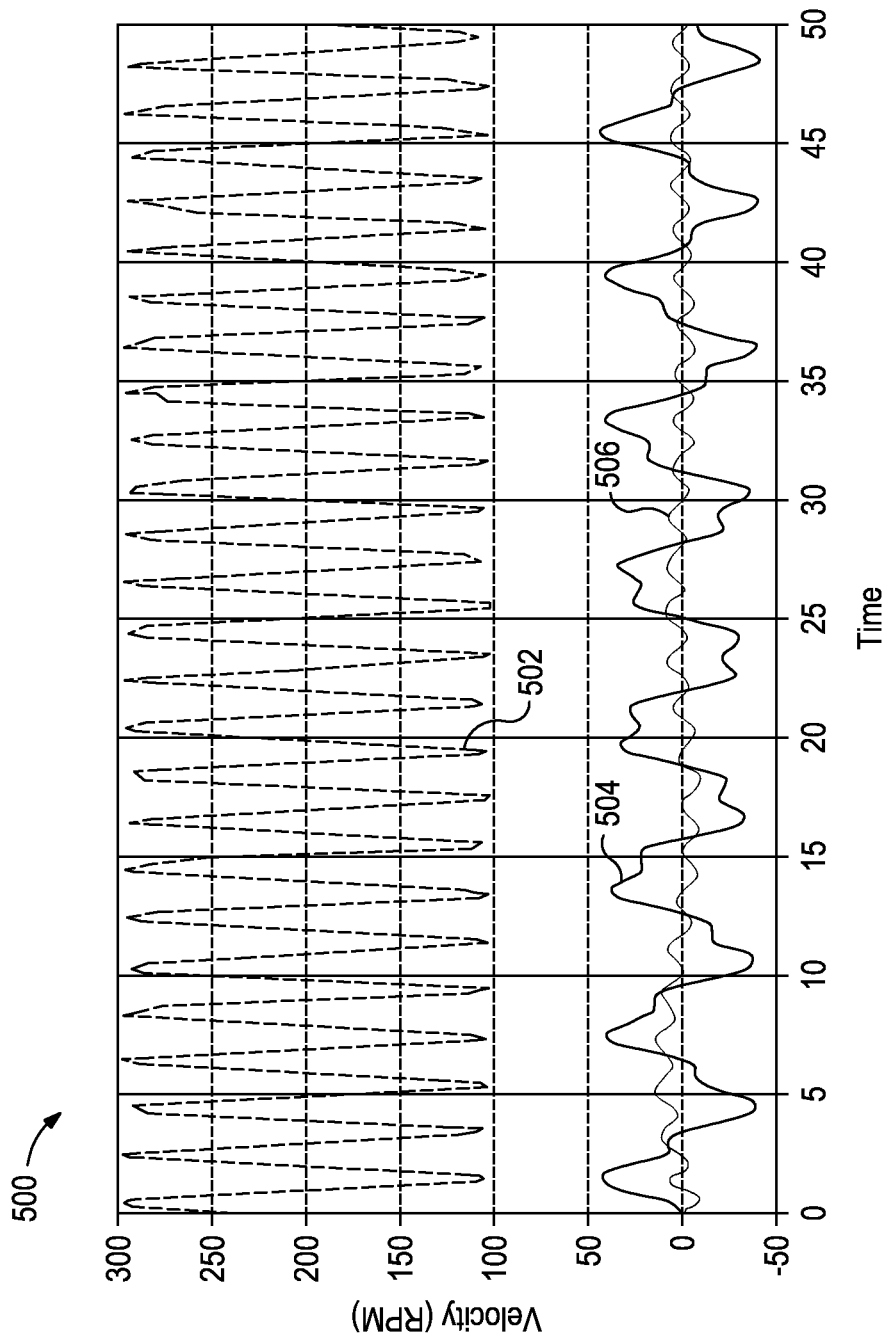
FIG. 5 is a plot that simulates the effect of a rigid mechanical coupling as compared to a more flexible mechanical coupling in view of stick-slip.

As further explanation, FIG. 5 depicts a plot 500 that simulates the effect of a rigid mechanical coupling 404 as compared to a more flexible mechanical coupling 404 in view of stick-slip disturbance, in accordance with the principles of the present disclosure. In the plot 500, stick-slip of the housing 202 is simulated by a first curve 502. As indicated, the velocity of the housing 202 during the simulated stick-slip oscillates between about 100 RPM and about 300 RPM. As indicated above, this oscillating velocity may generate stick-slip disturbance that may be transmitted to the offset mandrel 230 via the mechanical coupling 404 between the planetary gearbox 232 and the housing 202, and thereby affect the velocity and angular orientation of the offset mandrel 230. This can be seen in the second curve 504 provided in the plot 500, which represents the velocity of the offset mandrel 230 upon assuming the stick-slip disturbance transmitted through a rigid mechanical coupling. The rigid mechanical coupling, for example, may exhibit mechanical parameters that result in the transmission of more of the stick-slip disturbance between the housing 202 and the planetary gearbox 232 as compared to a more flexible mechanical coupling. As indicated, the velocity of the offset mandrel 230 oscillates between about 45 RPM and −45 RPM when using a rigid mechanical coupling in view the stick-slip disturbance.

To mitigate the effects of the stick-slip disturbance on the offset mandrel 230, the turbine 220 and the flow control valve 218 may be operated or controlled to offset the variable velocity and bring the velocity closer to 0 RPM where the offset mandrel 230 is maintained geostationary. However, attempting to mitigate the stick-slip disturbance can, in some cases, result in higher power demands that overload the control system, thereby leading to higher loads, increased wear of components, lower reliability, and ultimately inferior drilling performance. Under certain situations, the turbine 220 cannot be operated below a certain RPM due to constraints imposed on the assembly by electrical components, such as a generator, thus preventing the turbine 200 from chasing the tool RPM down to 0 RPM.

According to the present disclosure, the stick-slip disturbance may be mitigated or eliminated altogether by manipulating the mechanical parameters of the mechanical coupling 404, which may result in a more flexible mechanical coupling that reduces the stick-slip reaction forces transmitted from the housing 202 to the ring gear 302 via the mechanical coupling 404. This can be seen in the third curve 506 provided in the plot 500, which represents the velocity of the offset mandrel 230 using a mechanical coupling 404 that is more flexible as compared to the mechanical coupling 404 of the first curve 504. As can be seen, the velocity of the offset mandrel 230 oscillates closely around 0 RPM when using a more flexible mechanical coupling, thereby indicating that the stick-slip disturbance is mitigated when compared to the second curve 504.

Referring again to FIG. 4, an operator (or an automated computer system) may be able to take into account the mechanical parameters of the mechanical coupling 404 for a specific application to mitigate or remove the adverse effects of stick-slip as transmitted from the housing 202 to the ring gear 302. In some embodiments, the mechanical parameters (e.g., torsional spring constant (k), damping coefficient (c), inertia (J), etc.) may be manipulated and otherwise optimized by changing the type of mechanical coupling 404 used in the steering assembly 120. For instance, a threaded coupling may be changed to a mechanically-fastened engagement to provide a mechanical coupling 404 that is more flexible and therefore better equipped to mitigate stick-slip disturbance. In other embodiments, the mechanical parameters may be manipulated and otherwise optimized by changing the materials of one or both of the housing 202 and the ring gear 302. In yet other embodiments, the mechanical parameters may be manipulated and otherwise optimized by adding dampening materials to the mechanical coupling 404 that can interpose the rigid components of the housing 202 and the ring gear 302. Suitable dampening materials include, but are not limited to, soft metals, elastomers, foams, any combination thereof, and the like. In even further embodiments, the mechanical parameters of the mechanical coupling 404 may be manipulated and otherwise optimized in real-time during drilling operations, such as through the use of one or more actuators.

In some embodiments, the torsional spring constant (k) may be modified by introducing one or more flex components, such as bellows, a spider coupling, or types of flexible couplings. The torsional stiffness (k) may also be manipulated and otherwise modified by changing the length of the connection between the housing 202 and the ring gear 302. It will be appreciated, however, that any type of fluid coupling with a varying viscosity may achieve essentially the same thing.

Figure 6:
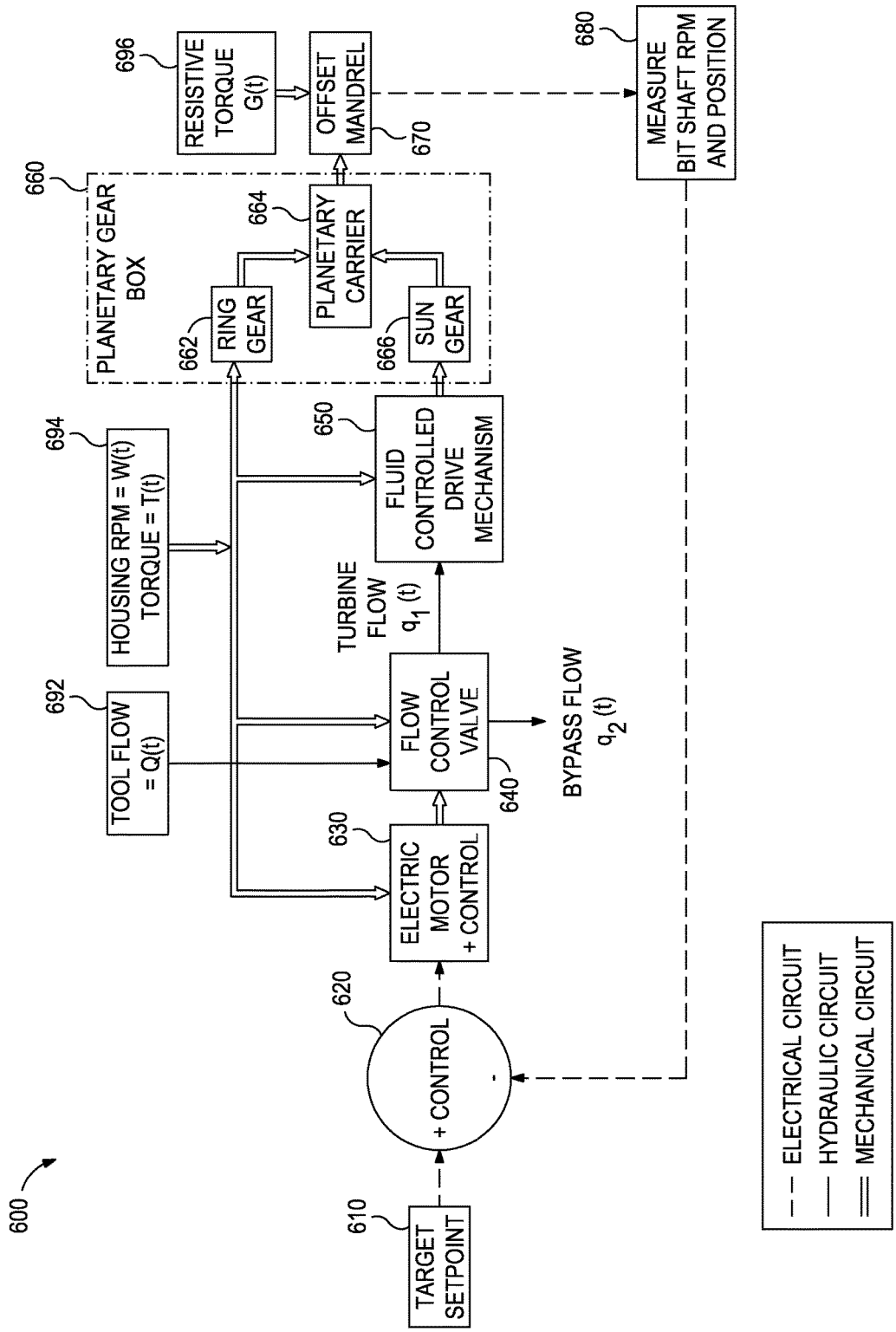
FIG. 6 is a block diagram of a closed-loop control system.

Referring now to FIG. 6, with continued reference to the prior figures, illustrated is a block diagram of a closed-loop control system 600, according to one or more embodiments of the present disclosure. At 610, a target setpoint may be input to a controller 620 via an electrical circuit. The target setpoint may specify a target rotation speed, position, magnetic alignment, or other measurable characteristic. In at least one embodiment, the target setpoint may correspond to a desired tool face 122 (FIG. 1) direction and, therefore, a desired longitudinal axis 124 (FIG. 1) of the drill bit 116 (FIG. 1). At 620, the controller may receive sensor measurement values 680 via an electrical circuit and calculate an error between the setpoint and the measured value. Based on the calculated error, the controller 620 may output a signal to an electric motor and control, as at 630. The controller 620 may be, for example, a PID-type controller that may determine an output signal based on a combination of proportional, integral, and derivative calculations of error.

At 630, the electric motor and control (e.g., any type of actuator or motor) may receive the output signal from the controller 620. The electric motor may be mechanically coupled to a flow control valve, such as the flow control valve 218 of FIG. 2B. Based on the signal received from the controller 620, the electric motor and control at 630 may operate to open or close the flow control valve. At 640, the flow control valve may experience a total tool flow of fluid over time 692, represented as the function Q(t). Some portion of the total tool flow of fluid over time Q(t) may be diverted to a bypass annulus, such as the bypass annulus 216 of FIG. 2B, and may be represented as bypass flow over time $q_2(t)$. The remaining fluid may be directed to a fluid-controlled drive mechanism, such as the turbine 220 of FIG. 2B, and may be represented as turbine flow $q_1(t)$. Thus, in a closed system, Q(t) will equal the sum of $q_1(t)$ and $q_2(t)$. The relative magnitudes of $q_1(t)$ and $q_2(t)$ may vary based on the opening and closing of the flow control valve by the motor and control at 630.

At 650, the fluid-controlled drive mechanism (e.g., the turbine 200) may generate a rotational force on its drive shaft 228 (FIG. 2B) to correspondingly rotate the sun gear 306 (FIG. 3), as at 666. The sun gear 306 forms part of the planetary gearbox 232 (FIGS. 2C and 3), as at 660. The magnitude of the rotational force may vary based on the magnitude of the turbine flow $q_1(t)$.

During drilling operations, the drill string 114 (FIG. 1) may be rotated, and thereby induce rotation in the housing 202 (FIG. 2A). This rotational force, as at 694, may be represented as housing RPMs over time ω(t) and as housing torque T(t) and may be mechanically transmitted to any components mechanically coupled to the housing 202. The rotational force, as at 694, is shown as being exerted on the motor 630, the flow control valve 640, the fluid-controlled drive mechanism 650, and the ring gear 302 (FIG. 3), as at 662, of the planetary gearbox 660. The planet carrier 304 (FIG. 3), as at 664, is mechanically coupled to the ring gear 662, and will have a rotational speed determined by the relative rotational speeds of the ring gear 662 and the sun gear 666.

At 670, the rotational speed of the planet carrier 664 is mechanically transmitted to an offset mandrel, such as the offset mandrel 230 (FIGS. 2C and 4). The offset mandrel 670 may be coupled, for example, to the bit shaft 206 (FIGS. 2A and 2C) and/or the drill bit 116 (FIG. 1). During drilling operations, the drill bit 116 may encounter rotational resistance in the form of stick-slip, shown as resistive torque, as at 696, and represented over time as G(t). The resistive torque G(t) may include the stick-slip disturbance described above.

At 680, the net of inputs over time of turbine flow $q_1(t)$, housing RPMs ω(t), housing torque T(t), resistive torque G(t), and any other relevant inputs may result in sensor measurement values 680 indicating the rotation speed, position, magnetic alignment, or other measurable characteristics of the offset mandrel, the bit shaft, and/or the drill bit. In some embodiments, the mechanical parameters of the mechanical coupling 404 (i.e., spring coefficient (k), damping coefficient (c), and inertia (J)) may also affect the sensor measurement values 680. Those measurement values may be electrically communicated to the controller 620, which may in turn calculate an updated error value and adjust the electrical output signal to the electric motor and control 630. In this way, the desired setpoint may be achieved automatically through a closed-loop control mechanism. As one of skill in the art will appreciate in light of the present disclosure, the mechanism may also be robust against disruptions, such as variations in the drill string RPM, changes in resistive torque G(t) on the offset mandrel due to varying load on the bearings during drilling, variations in tool flow due to pressure changes or pulsar operations, etc.

In alternative embodiments, the controller 620 may be configured to determine its output signal based at least in part on anticipated future error using, for example, sensor measurements of inputs such as tool flow Q(t), housing RPMs ω(t), housing torque T(t), and resistive torque G(t). Thus, for example, if a sensor measures a disruption in tool flow Q(t), the controller 620 may appropriately adjust its output signal to offset the observed disruption. In this way, the controller 620 may also anticipate errors and issue proactive control signals to prevent the errors (e.g., an adaptive or feed-forward type of control).

Embodiments disclosed herein include:

A. A steering assembly that includes a housing having an actuator positioned therein and operable to rotate a drive shaft, a planetary gearbox positioned within the housing and including a ring gear operatively coupled to the housing, one of a sun gear and a planet carrier coupled to the drive shaft, and one or more planet gears that rotate about the sun gear, a mechanical coupling operatively coupling the ring gear to the housing such that rotation of the housing rotates the ring gear, wherein the mechanical coupling is selected based on an ability of one or more mechanical parameters of the mechanical coupling to mitigate the stick-slip disturbance transmitted between the housing and the ring gear, and an offset mandrel coupled to one of the sun gear and the planet carrier such that rotation of the one of the sun gear and the planet carrier causes the offset mandrel to correspondingly rotate, wherein the offset mandrel is independently rotatable with respect to the housing.

B. A method that includes introducing a steering assembly into a wellbore on a drill string, the steering assembly including a housing having an actuator and a planetary gearbox positioned within the housing, the planetary gearbox including a ring gear operatively coupled to the housing, and one of a sun gear and a planet carrier coupled to a drive shaft of the actuator, rotating the drill string in a first direction and thereby rotating the housing and the ring gear in the first direction, operating the actuator to rotate the drive shaft and an offset mandrel coupled to one of the sun gear and the planet carrier in a second direction opposite the first direction, and mitigating stick-slip disturbance transmitted between the housing and the ring gear and to the offset mandrel with a mechanical coupling that operatively couples the ring gear to the housing, wherein the mechanical coupling is selected based on an ability of one or more mechanical parameters of the mechanical coupling to mitigate the stick-slip disturbance.

C. A well system that includes a drill string extendable into a wellbore and having a drill bit coupled to an end of the drill string, a steering assembly arranged in the drill string and including a housing rotatable with the drill string, the housing having an actuator and a planetary gearbox positioned within the housing, and the planetary gearbox including a ring gear operatively coupled to the housing, and one of a sun gear and a planet carrier coupled to a drive shaft of the actuator, a mechanical coupling operatively coupling the ring gear to the housing such that rotation of the housing rotates the ring gear, wherein the mechanical coupling is selected based on one or more mechanical parameters of the mechanical coupling and the ability of the one or more mechanical parameters to mitigate stick-slip disturbance transmitted between the housing and the ring gear, and an offset mandrel coupled to one of the sun gear and the planet carrier such that rotation of the one of the sun gear and planet carrier causes the offset mandrel to correspondingly rotate, wherein the offset mandrel is independently rotatable with respect to the housing.

Each of embodiments A, B, and C may have one or more of the following additional elements in any combination: Element 1: wherein the ring gear is directly coupled to the housing via the mechanical coupling. Element 2: wherein the planetary gearbox further includes a gearbox carrier that interposes the housing and the ring gear, and wherein the ring gear is indirectly coupled to the housing via the mechanical coupling and the gearbox carrier. Element 3: wherein the mechanical coupling comprises a coupling engagement selected from the group comprising, a threaded coupling, a magnetic coupling, a welded coupling, a brazed coupling, a mechanically fastened coupling, an adhesive coupling, bellows, a spider coupling, and any combination thereof. Element 4: wherein the one or more mechanical parameters are parameters selected from the group consisting of torsional spring constant (k), damping coefficient (c), and inertia (J). Element 5: wherein the one or more mechanical parameters are optimized for downhole use to mitigate the stick-slip disturbance. Element 6: further comprising one or more sensors arranged proximate to the offset mandrel, and a controller communicably coupled to the one or more sensors, wherein the controller receives measurements taken by the one or more sensors and outputs a control signal that causes a change in rotational speed of the drive shaft. Element 7: wherein the controller is a PID controller. Element 8: wherein the actuator is selected from the group consisting of a fluid-controlled drive mechanism, a turbine, a mud motor, an electric motor, and any combination thereof.

Element 9: wherein operating the actuator comprises maintaining the offset mandrel geostationary with respect to a surrounding formation. Element 10: further comprising manipulating the one or more mechanical parameters of the mechanical coupling to mitigate the stick-slip disturbance, the one or more mechanical parameters being parameters selected from the group consisting of torsional spring constant (k), damping coefficient (c), and inertia (J). Element 11: wherein manipulating the one or more mechanical parameters of the mechanical coupling comprises changing a type of mechanical coupling to a more flexible mechanical coupling. Element 12: wherein manipulating the one or more mechanical parameters of the mechanical coupling comprises changing a material of at least one of the housing and the ring gear. Element 13: wherein manipulating the one or more mechanical parameters of the mechanical coupling comprises adding a dampening material to the mechanical coupling. Element 14: wherein manipulating the one or more mechanical parameters of the mechanical coupling comprises optimizing the one or more mechanical parameters to mitigate the stick-slip disturbance. Element 15: further comprising setting a target measurement at a controller, taking at least one measurement with one or more sensors arranged proximate to the offset mandrel and communicably coupled to the controller, receiving the at least one measurement with the controller, calculating an error based on a comparison of the at least one measurement and the target measurement, and outputting a control signal from the controller to cause a change in rotational speed of the drive shaft, wherein the control signal is based on the error.

Element 16: wherein the mechanical coupling comprises a coupling engagement selected from the group comprising, a threaded coupling, a magnetic coupling, a welded coupling, a brazed coupling, a mechanically fastened coupling, an adhesive coupling, bellows, a spider coupling, and any combination thereof. Element 17: wherein the one or more mechanical parameters are parameters selected from the group consisting of torsional spring constant (k), damping coefficient (c), and inertia (J). Element 18: further comprising one or more sensors arranged proximate to the offset mandrel, and a controller communicably coupled to the one or more sensors, wherein the controller receives measurements taken by the one or more sensors and outputs a control signal that causes a change in rotational speed of the drive shaft.

By way of non-limiting example, exemplary combinations applicable to A, B, and C include: Element 10 with Element 11; Element 10 with Element 12; Element 10 with Element 13; and Element 10 with Element 14.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The use of directional terms such as above, below, upper, lower, upward, downward, left, right, uphole, downhole and the like are used in relation to the illustrative embodiments as they are depicted in the figures, the upward direction being toward the top of the corresponding figure and the downward direction being toward the bottom of the corresponding figure, the uphole direction being toward the surface of the well and the downhole direction being toward the toe of the well.

What is claimed is:

1. A steering assembly, comprising:
    a housing having an actuator positioned therein and operable to rotate a drive shaft;
    a planetary gearbox positioned within the housing and including a ring gear operatively coupled to the housing, one of a sun gear and a planet carrier coupled to the drive shaft, and one or more planet gears that rotate about the sun gear;
    a mechanical coupling configured to controllably couple the ring gear to the housing such that rotation of the housing rotates the ring gear;
    an offset mandrel coupled to one of the sun gear and the planet carrier such that rotation of the one of the sun gear and the planet carrier causes the offset mandrel to correspondingly rotate, wherein the offset mandrel is independently rotatable with respect to the housing; and
    a controller configured to alter a parameter of the mechanical coupling in response to a sensed stick-slip disturbance transmitted between the housing and the ring gear.

2. The steering assembly of claim 1, wherein the ring gear is directly coupled to the housing via the mechanical coupling.

3. The steering assembly of claim 1, wherein the planetary gearbox further includes a gearbox carrier that interposes the housing and the ring gear, and wherein the ring gear is indirectly coupled to the housing via the mechanical coupling and the gearbox carrier.

4. The steering assembly of claim 1, wherein the mechanical coupling comprises a coupling engagement selected from the group comprising, a threaded coupling, a magnetic coupling, a welded coupling, a brazed coupling, a mechanically fastened coupling, an adhesive coupling, bellows, a spider coupling, and any combination thereof.

5. The steering assembly of claim 1, wherein the one or more mechanical parameters are parameters selected from the group consisting of torsional spring constant (k), damping coefficient (c), and inertia (J).

6. The steering assembly of claim 1, wherein the one or more mechanical parameters are optimized for downhole use to mitigate the stick-slip disturbance.

7. The steering assembly of claim 1, further comprising:
    one or more sensors arranged proximate to the offset mandrel; and
    a controller communicably coupled to the one or more sensors, wherein the controller receives measurements taken by the one or more sensors and outputs a control signal that causes a change in rotational speed of the drive shaft.

8. The steering assembly of claim 7, wherein the controller is a PID controller.

9. The steering assembly of claim 1, wherein the actuator is selected from the group consisting of a fluid-controlled drive mechanism, a turbine, a mud motor, an electric motor, and any combination thereof.

10. A method, comprising:
    introducing a steering assembly into a wellbore on a drill string, the steering assembly including a housing having an actuator and a planetary gearbox positioned within the housing, the planetary gearbox including a ring gear operatively coupled to the housing, and one of a sun gear and a planet carrier coupled to a drive shaft of the actuator;
    rotating the drill string in a first direction and thereby rotating the housing and the ring gear in the first direction;
    operating the actuator to rotate the drive shaft and an offset mandrel coupled to one of the sun gear and the planet carrier in a second direction opposite the first direction; and
    mitigating stick-slip disturbance transmitted between the housing and the ring gear and to the offset mandrel with a mechanical coupling that operatively couples the ring gear to the housing by altering a parameter of the mechanical coupling in response to a sensed stick-slip disturbance transmitted between the housing and the ring gear.

11. The method of claim 10, wherein operating the actuator comprises maintaining the offset mandrel geostationary with respect to a surrounding formation.

12. The method of claim 10, further comprising manipulating the one or more mechanical parameters of the mechanical coupling to mitigate the stick-slip disturbance, the one or more mechanical parameters being parameters selected from the group consisting of torsional spring constant (k), damping coefficient (c), and inertia (J).

13. The method of claim 12, wherein manipulating the one or more mechanical parameters of the mechanical coupling comprises changing a type of mechanical coupling to a more flexible mechanical coupling.

14. The method of claim 12, wherein manipulating the one or more mechanical parameters of the mechanical coupling comprises changing a material of at least one of the housing and the ring gear.

15. The method of claim 12, wherein manipulating the one or more mechanical parameters of the mechanical coupling comprises adding a dampening material to the mechanical coupling.

16. The method of claim 12, wherein manipulating the one or more mechanical parameters of the mechanical coupling comprises optimizing the one or more mechanical parameters to mitigate the stick-slip disturbance.

17. The method of claim 10, further comprising:
setting a target measurement at a controller;
taking at least one measurement with one or more sensors arranged proximate to the offset mandrel and communicably coupled to the controller;
receiving the at least one measurement with the controller;
calculating an error based on a comparison of the at least one measurement and the target measurement; and
outputting a control signal from the controller to cause a change in rotational speed of the drive shaft, wherein the control signal is based on the error.

18. A well system, comprising:
a drill string extendable into a wellbore and having a drill bit coupled to an end of the drill string;
a steering assembly arranged in the drill string and including a housing rotatable with the drill string, the housing having an actuator and a planetary gearbox positioned within the housing, and the planetary gearbox including a ring gear operatively coupled to the housing, and one of a sun gear and a planet carrier coupled to a drive shaft of the actuator;
a mechanical coupling operatively coupling the ring gear to the housing such that rotation of the housing rotates the ring gear;
an offset mandrel coupled to one of the sun gear and the planet carrier such that rotation of the one of the sun gear and planet carrier causes the offset mandrel to correspondingly rotate, wherein the offset mandrel is independently rotatable with respect to the housing; and
a controller configured to alter a parameter of the mechanical coupling in response to a rotational resistance encountered by the drill bit in the form of a stick-slip disturbance.

19. The well system of claim 18, wherein the mechanical coupling comprises a coupling engagement selected from the group comprising, a threaded coupling, a magnetic coupling, a welded coupling, a brazed coupling, a mechanically fastened coupling, an adhesive coupling, bellows, a spider coupling, and any combination thereof.

20. The well system of claim 18, wherein the one or more mechanical parameters are parameters selected from the group consisting of torsional spring constant (k), damping coefficient (c), and inertia (J).

21. The well system of claim 18, further comprising:
one or more sensors arranged proximate to the offset mandrel; and
a controller communicably coupled to the one or more sensors, wherein the controller receives measurements taken by the one or more sensors and outputs a control signal that causes a change in rotational speed of the drive shaft.

* * * * *